July 26, 1949.　　　　　J. MARTIN　　　　　2,477,490
FORM TOOL PLANER

Filed July 12, 1945　　　　　　　　　　　4 Sheets-Sheet 1

INVENTOR.
James Martin.
BY
Harness, Dickey & Pierce
ATTORNEYS.

July 26, 1949.　　　　　J. MARTIN　　　　　2,477,490
FORM TOOL PLANER

Filed July 12, 1945　　　　　　　　　　　　4 Sheets-Sheet 3

INVENTOR.
James Martin.
BY
Harness, Dickey & Pierce
ATTORNEYS.

July 26, 1949.                    J. MARTIN                    2,477,490
                                FORM TOOL PLANER
Filed July 12, 1945                                          4 Sheets-Sheet 4
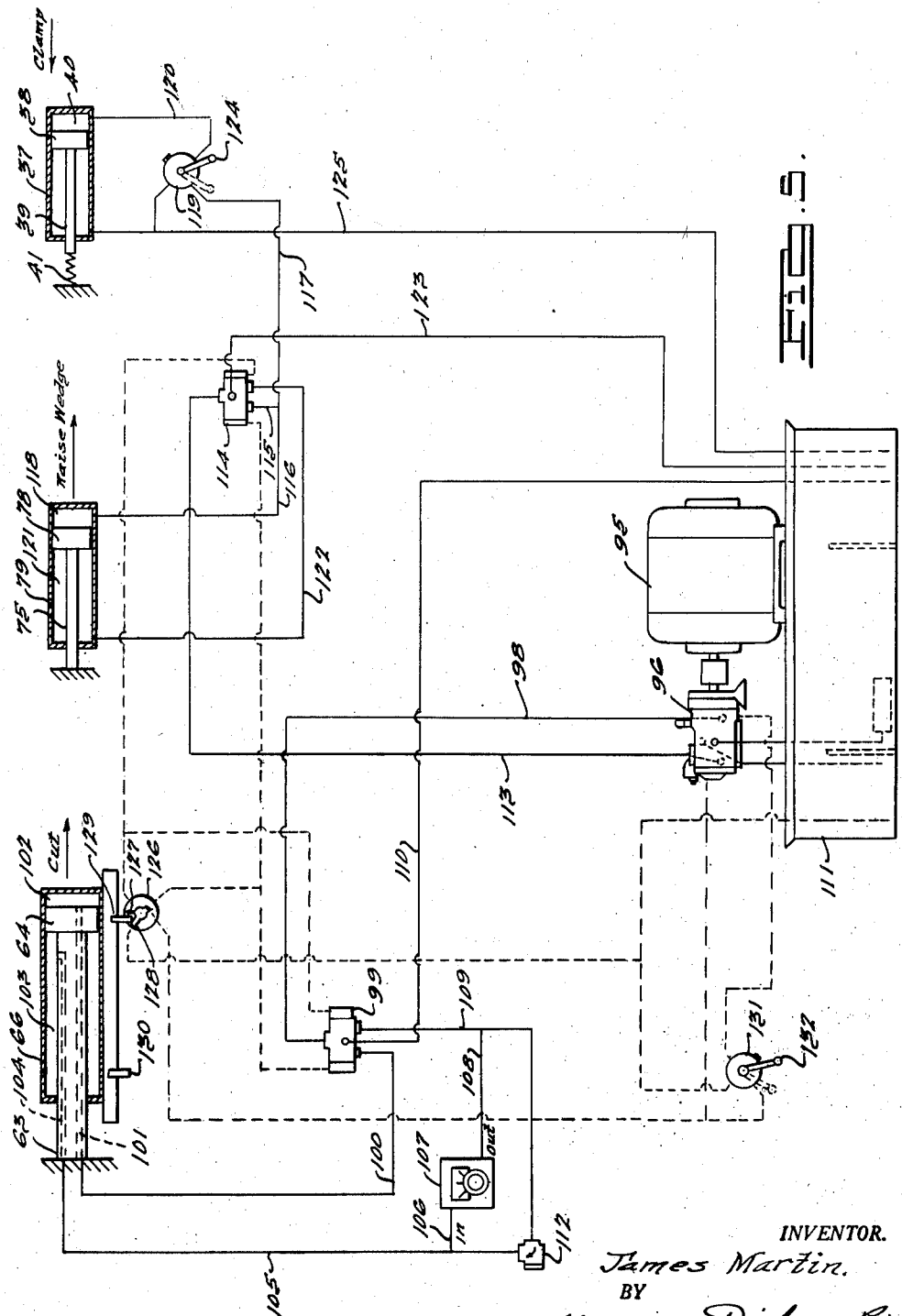
INVENTOR.
James Martin.
BY
Harness, Dickey & Pierce
ATTORNEYS.

Patented July 26, 1949

2,477,490

UNITED STATES PATENT OFFICE 2,477,490

FORM TOOL PLANER

James Martin, Ferndale, Mich., assignor to Michigan Tool Company, Detroit, Mich., a corporation of Delaware Application July 12, 1945, Serial No. 604,612

2 Claims. (Cl. 90—59)

This invention relates generally to metal planing machines. More particularly, it relates to a metal planing machine primarily designed and intended for production of form tools or similar articles of manufacture.

In past practice, form tools have been produced by grinding or first roughing on a shaper and then applying a finish grind to obtain a polished cutting surface. For form tools of relatively simple contour, this has been sufficient. However, as industry expands, manufacturers of form tools are increasingly called upon to produce form tools of intricate contour which often cannot be produced by the above methods, or only with great difficulty and great expense as all cutting surfaces of a form tool must be highly polished so as to be free of all defects. When, because of the peculiar angles at which the surfaces of the form tool are disposed, it becomes extremely difficult or impossible to produce them as described before, other methods involving great cost and loss of time must be used.

It is an object of my invention to provide a novel and improved planing machine to eliminate this difficulty by providing a wide range of adjustments between the cutting tool and workpiece for producing surfaces on the workpiece at whatever angle they may be disposed, and also providing for extremely slow reciprocation of the workpiece relative to the cutting tool on the finishing strokes, making possible the production of form tools having finely finished surfaces, regardless of the vagaries of shaping, and which need only be hardened to be used in the manufacture of products requiring a high degree of excellency.

It is a further object of the invention to provide a machine of this general character in which the mounting of the tool relative to the workpiece may be adjusted and controlled with a high degree of accuracy. In order to accomplish this result, the present invention contemplates a machine in which automatic hydraulically controlled means are provided for positively and rigidly locking both the tool holder and workpiece holder during the cutting stroke. The present invention also contemplates the provision of manually controlled means for unlocking the tool holder so that the operator may apply minute adjustments to the cutting tool while reciprocating the workpiece very slowly on the finishing strokes, thereby securing an extremely fine finish on the form tool being made.

It is a further object of the present invention to provide a novel and improved construction for mounting the workpiece in order, first, to rigidly lock it during the cutting stroke and, second, to unlock it and permit its retraction during the return stroke. In this connection, the present invention contemplates the provision of novel means which not only insure that the workpiece is positively locked during the cutting stroke, but insure that after it has been unlocked and retracted it will be returned with great precision to the position it previously occupied when relocked for the next cutting stroke.

Still further, the present invention contemplates apparatus for producing these desirable results which will be substantially automatic in operation and will in no wise depend upon the ability or skill of the operator.

Another object of the invention consists in novel and improved means for mounting the cutting tool, which includes not only means for anchoring the cutting tool in predetermined, angular position with respect to the line of reciprocation of the workpiece, but also includes feed mechanism for accurately feeding the cutting tool toward the workpiece as the cutting operation proceeds.

In addition, the present invention contemplates means for varying the speed of reciprocation of the workpiece in one direction for a cutting stroke, while maintaining reciprocation in an opposite direction for a return stroke always at the maximum speed of reciprocation. In the usual type planing machine, a speed adjustment for reciprocation in one direction results in reciprocation at a similar speed in an opposite direction with consequent loss of operating time. Thus, it is apparent that a planing machine embodying my invention will substantially reduce this loss.

Other objects of the invention will become apparent from the following specification, the drawings relating thereto, and the claims hereinafter set forth.

In the drawings, in which like numerals are used to designate like views throughout:

Figure 5 is a diagrammatic sketch of an automatic hydraulic system for use with a machine embodying the principles of my invention.

Figure 1:
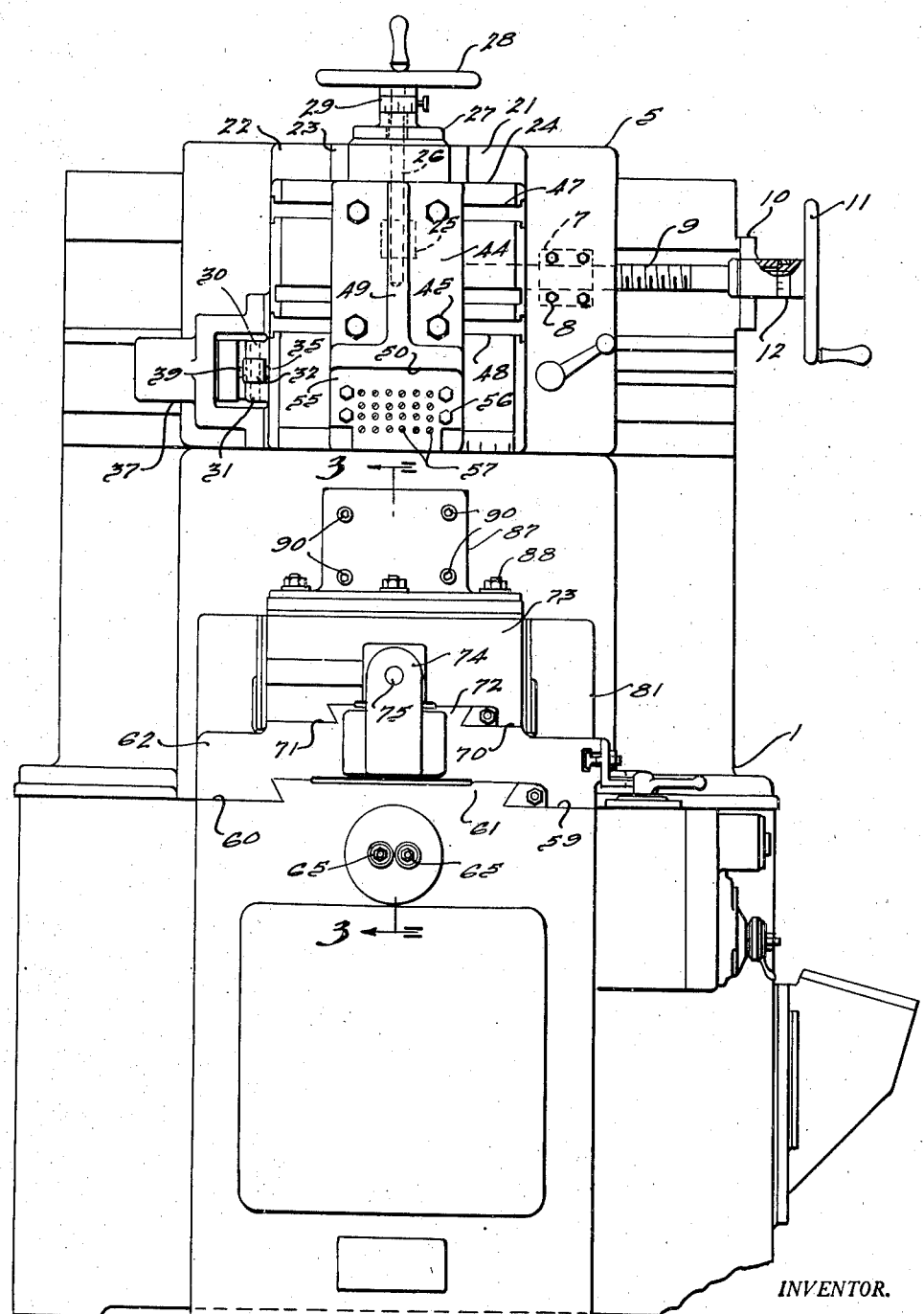
Figure 1 is a front elevation of a planing machine embodying the principles of my invention.
Figure 2:
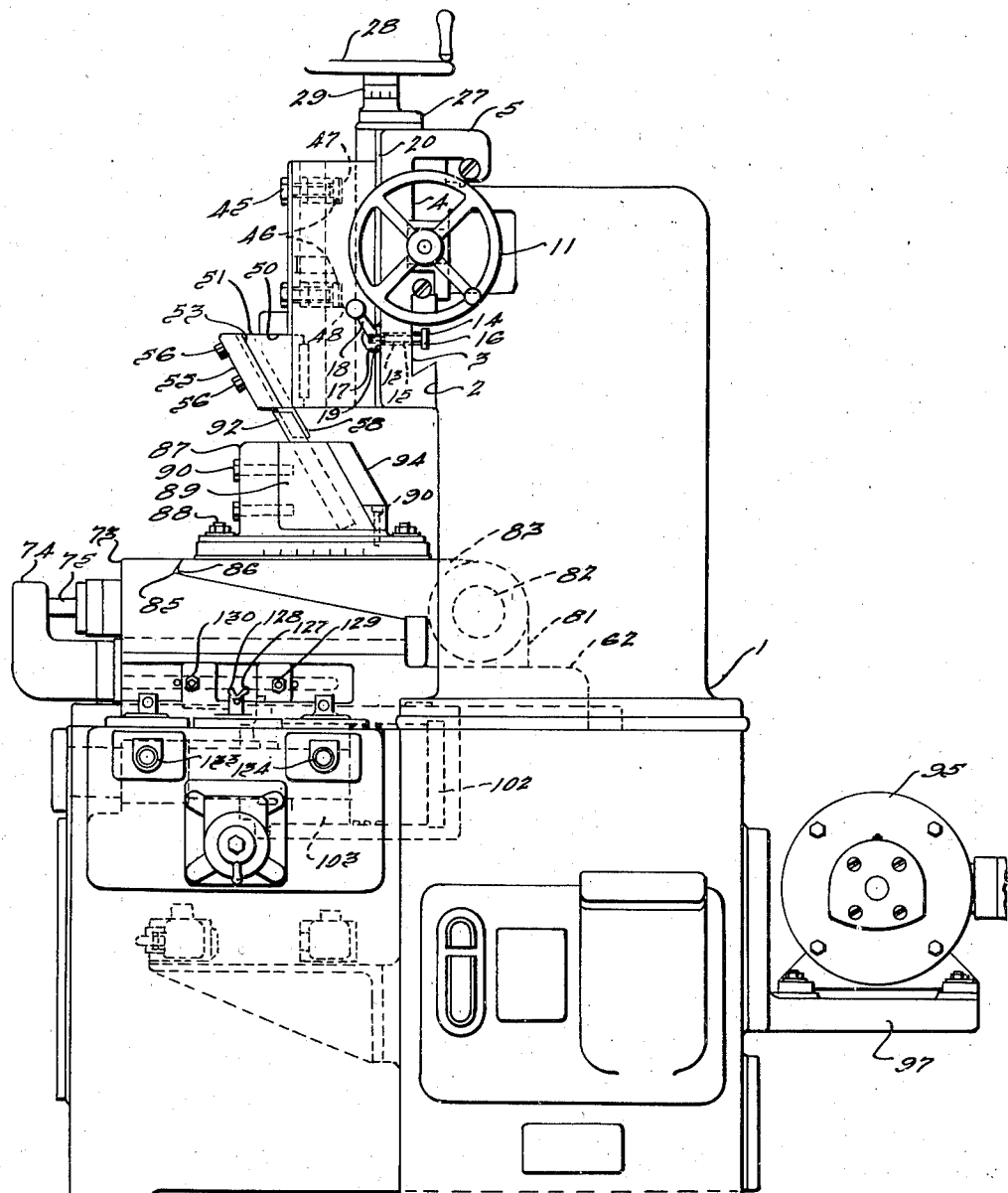
Figure 2 is a side elevational view of the machine shown in Figure 1.
Figure 3:
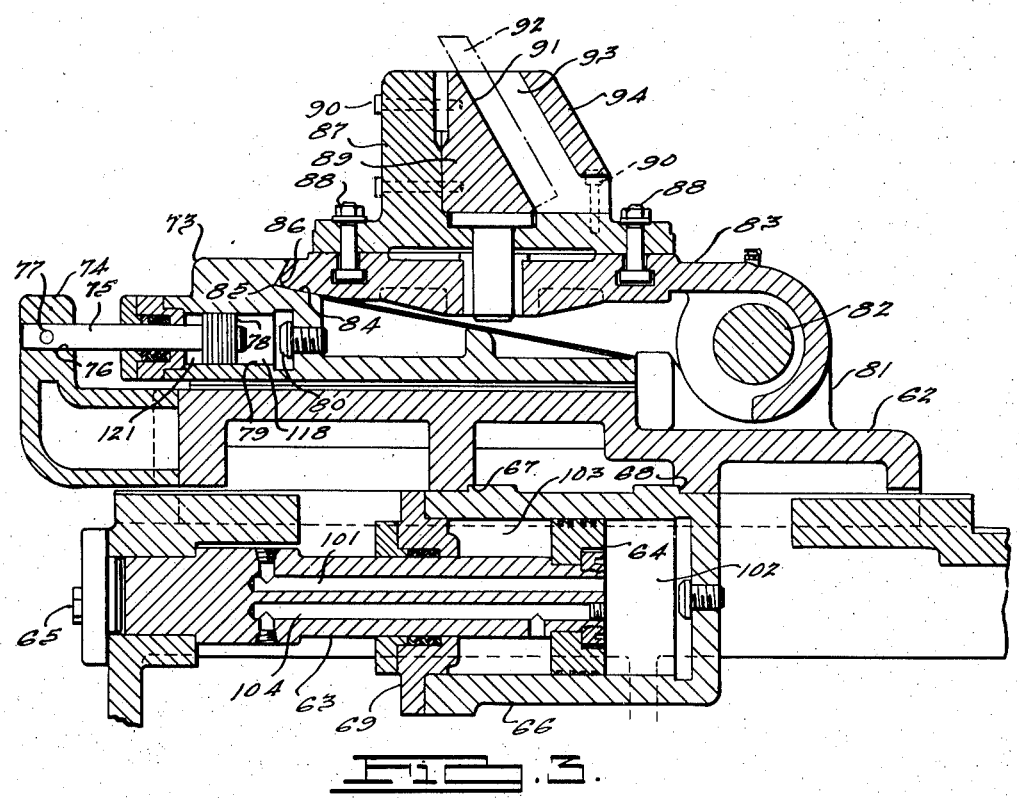
Figure 3 is a sectional view taken on the line 3—3 of Figure 1, showing the workpiece rigidly and positively locked in position for the cutting stroke.
Figure 4:
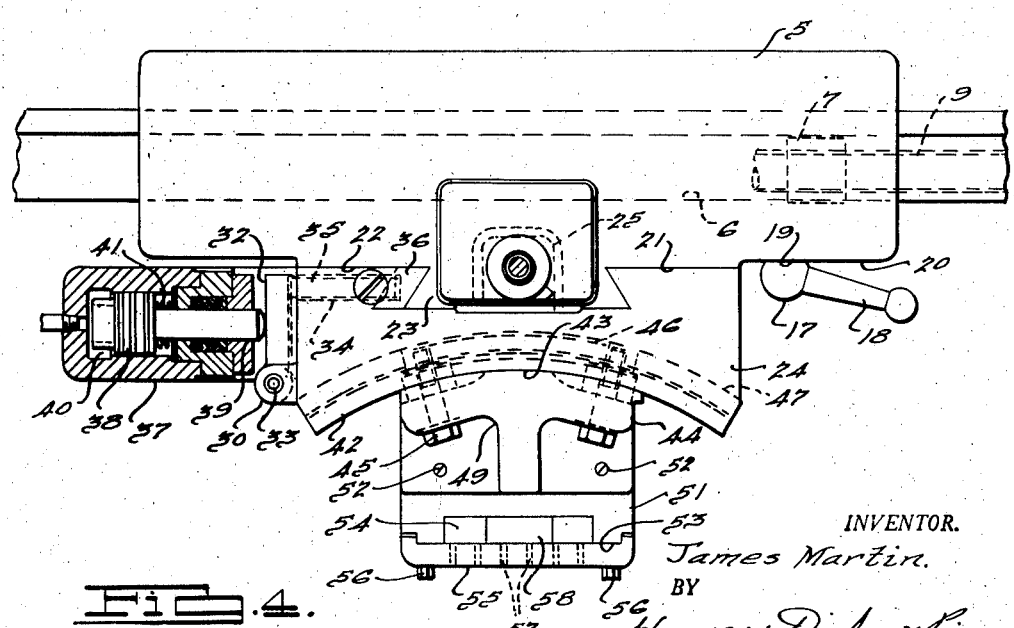
Figure 4 is a partly sectioned plan view showing the cutting tool secured by the tool holder and means for locking the same in vertical adjustment.

According to the present invention, a construction is provided in which a cutting tool is retained in a toolholder secured to a mount which may be adjusted to place the cutting tool in spaced relationship horizontally and vertically with respect to a workpiece. Means are provided for automatically locking the cutting tool in vertical adjustment on the cutting stroke and releasing it on a return stroke for manual feeding.

The workpiece is mounted on a carriage capable of being reciprocated horizontally so as to bring the workpiece into cutting engagement with the cutting tool. As the workpiece is reciprocated in one direction toward the cutting tool, it is rotatably raised and locked in position for engagement with the cutting tool. Reciprocation in an opposite direction causes the workpiece to be unlocked and rotatably lowered out of engagement with the cutting tool and thus remain free of injury which might occur should the workpiece contact the cutting tool on a return stroke. This cycle is automatically repeated until the planing operation is complete.

For a more detailed description of the invention, reference may be had to the accompanying drawings in which a base is generally indicated at 1. Such base 1 has at an upper part horizontal, machined surface 2 and slideways 3 and 4, upon which horizontally adjustable tool carriage 5 is slidably mounted. Near one side of the tool carriage 5, and on its rear face 6, bearing nut 7 is positioned by a plurality of bolt means 8 to threadably engage a screw 9. The outer end of screw 9, having no thread thereon, is mounted in suitable bearing 10 mounted on base 1. At the extreme outer end of screw 9, adjacent to bearing 10, handwheel 11 with hub 12 is keyed thereto. It will thus be evident that by turning handwheel 11 the screw 9 is correspondingly turned to move tool carriage 5 horizontally a definite amount measured by the finely divided graduations throughout the 360 degrees of surface of hub 12.

Below bearing nut 7, horizontal opening 13 extends through tool carriage 5, mating with T-slot 14 in slideway 3. A T-bolt 15 with head 16 slidably engaged in T-slot 14 passes through opening 13. Round head nut 17, having arm 18, threadably engages T-bolt 15 so that rotation of arm 18 tightens head 16 of T-bolt 15 in T-slot 14, causing face 19 of nut 17 to bear upon face 20 of tool carriage 5 to lock it in horizontal placement when desired.

On face 20 of tool carriage 5 are raised, vertically disposed, machined surfaces 21 and 22 and slideway 23 for slidably engaging tool slide 24. Appended to the rear of tool slide 24 at its vertical center and somewhat above the horizontal center thereof, is bearing nut 25 adapted to threadably engage screw 26 passing therethrough. The upper end of screw 26, having no threaded portion thereon, is mounted in thrust bearing 21 on tool carriage 5. At the top of screw 26 and keyed thereto, is handwheel 28 having hub 29. It is evident that by turning handwheel 28 the screw 26 is correspondingly turned to raise or lower tool slide 24 a definite amount measured by the finely divided graduations throughout the 360 degrees of surface of the hub 29.

At one side of tool slide 24 and extending therefrom are ears 30 and 31 having holes drilled therein. Positioned between said ears, clamp arm 32 is hinged by means of hinge pin 33 which extends through the drilled holes in ears 30 and 31 and the drilled hole in said clamp arm 32. The rear face of tool slide 24 opposite ears 30 and 31 is provided with a horizontal opening 34 through which pin 35 passes, contacting at its outer end clamp arm 32 and at its inner end gib member 36. Appended to tool slide 24 adjacent said clamp arm 32 is hydraulic cylinder 37 containing piston 38 with piston rod 39 positioned in such spaced relationship with clamp arm 32 as to contact the same as fluid enters chamber 40 and overcomes the resistance of retracting spring 41. Thus, it is apparent that as piston rod 39 contacts clamp arm 32, such clamp arm 32 immediately contacts pin 35 which in turn presses upon gib member 36 locking tool slide 24 in fixed vertical adjustment, and also preventing any sidewise movement of tool slide 24, for the force transmitted by piston rod 39 is distributed between hinge pin 33 and pin 35, rigidly supporting tool slide 24 in a side direction for resisting side pressure from a cutting tool as it engages a workpiece.

Tool slide 24 has at its front face concave, arcuately shaped, machined surface 42 capable of receiving segmental, cylindrical surface 43 of tool swivel 44. A plurality of bolts 45 extending through tool swivel 44, normal to surface 43, threadably engage T-nuts 46 slidably positioned in T-slots 47 and 48 of tool slide 24. Thus, tool swivel 44 may be arcuately adjusted about a vertical axis and fixedly positioned upon tightening of the bolts 45 to bring T-nuts 46 into frictional engagement with T-slots 47 and 48.

Projecting outwardly from tool swivel 44 is a rib generally indicated at 49, having lower machined surface 50 to which toolholder 51 is secured by bolt means 52. The forward face 53 of toolholder 51 is milled angularly to the line of reciprocation of a workpiece, and provides a recess 54 also milled angularly to the line of reciprocation of the workpiece. Cap 55, secured by bolt means 56 to toolholder 51, covers recess 54, and provides a plurality of screw means 57 for securing cutting tool 58.

It is evident from the foregoing description that inasmuch as tool swivel 44 is arcuately adjustable in tool slide 24, and recess 54 of toolholder 51 is angularly disposed to the line of reciprocation of the workpiece, arcuate-angular adjustment is provided for cutting tool 58. The value of such adjustment will be readily apparent to those who have attempted by various means, generally unsatisfactory, to provide such adjustment on the usual planing machine.

A lower portion of base 1 has horizontal, machined surfaces 59 and 60 and slideway 61 upon which work carriage 62 is mounted to be slidably reciprocated horizontally. A piston rod 63 with piston 64 fixed thereto is secured to base 1 by bolt means 65 at a point below and central to work carriage 62. Hydraulic cylinder 66 with shoulders contacting work carriage 62 at 67 and 68, encloses piston 64 while permitting piston rod 63 to extend therethrough, through its cap 69 and is supported by said piston rod 63 and piston 64.

As fluid is admitted alternately to opposite sides of piston 64, cylinder 66 is caused to reciprocate horizontally and with it work carriage 62 by virtue of the contacts 67 and 68.

The upper surface of work carriage 62 has horizontal machined surfaces 70 and 71 and slideway 72 upon which a slidable locking wedge 73 is mounted. Arm 74 of work carriage 62 fixedly secures piston rod 75 in bearing 76 by means of pin 77. Piston 78 at the opposite end of piston rod 75 is enclosed by hydraulic cylinder 79 contained in the body of slidable locking wedge 73. Thus, slidable locking wedge 73, while being reciprocated with work carriage 62, also has independent reciprocation imparted to it when fluid is admitted to alternate sides of piston 78. A stop 80 is provided to limit the independent reciprocation of slidable locking wedge 73.

At an end of work carriage 62 opposite that of arm 74, bearing 81 extends upwardly from the surface thereof to support shaft 82 upon which work-supporting wedge generally indicated at 83 is rotatably mounted on shaft 82. Therefore, reciprocation of work carriage 62 results in reciprocation of work supporting wedge 83, as bearing 81 is part of work carriage 62.

As work carriage 62 is reciprocated in one direction, carrying slidable locking wedge 73 and work supporting wedge 83 with it, the independent reciprocation of slidable locking wedge 73 propels said wedge in a similar direction toward work supporting wedge 83. In so doing, the slanting surface 84 of slidable locking wedge 73, which is always contacting work supporting wedge 83, slides along work supporting wedge 83 guiding that member into V-aperture 85 to rigidly and positively lock it therein and so doing causes work supporting wedge 83 to be rotatably raised. It should be noted that the extreme end of work supporting wedge 83 is radially relieved at 86 to prevent binding when in contact with V-aperture 85. When work carriage 62 is reciprocated in an opposite direction, slidable locking wedge 73 is again independently reciprocated, disengaging V-aperture 85 from work supporting wedge 83 in an unlocking action and work supporting wedge 83 is rotatably lowered.

Workpiece holder support 87 is adjustably mounted on work wedge 83 by a plurality of bolt means 88. Such support 87 carries workpiece holder 89 secured to it by bolt means 90. The rear face 91 of workpiece holder 89 is milled angularly to the line of reciprocation of workpiece 92, and provides a recess 93 also milled angularly to the line of reciprocation of workpiece 92. Cap 94, secured by bolt means (not shown), covers recess 93, and provides a plurality of screws (not shown) for securing workpiece 92. (It is pointed out that the angular disposition of workpiece 92 and cutting tool 58 with respect to the line of reciprocation of workpiece 92 are equal.) It is seen then that when work supporting wedge 83 is rotatably raised and locked into position, workpiece 92 is thereby raised and locked in position to engage cutting tool 58 and, as work supporting wedge 83 is unlocked and rotatably lowered, workpiece 92 rotates downwardly out of engagement with cutting tool 58 for a return stroke.

As a means of providing for hydraulic operation of a machine embodying my invention, a suitable prime mover in the form of an electric motor 95 is used to operate a double pump, generally indicated at 96 (Figure 5). Supported by mount 97 at a lower, rear portion of base 1, motor 95 drives pump 96 contained (but not shown) in base 1. For smooth, steady reciprocation of work carriage 62, one of the pumps indicated at 96 supplies hydraulic fluid through pressure line 98 to a pilot-operated four-way valve 99. On reciprocation for a cutting stroke, fluid is delivered to valve 99 which directs it through line 100 to passageway 101 in piston rod 63, thence to chamber 102 of hydraulic cylinder 66, which being movable is reciprocated, propelling with it work carriage 62. As hydraulic fluid enters chamber 102, fluid in chamber 103 is exhausted through passageway 104 into lines 105, 106 for passage through speed control valve 107 to lines 108, 109 to four-way valve 99 which directs it for return through line 110 to reservoir 111. Valve 107 may be manually adjusted to control the rate of flow of hydraulic fluid being exhausted from chamber 103 and thus control the speed with which work carriage 62 is propelled on its cutting stroke. For the return stroke, hydraulic fluid under pressure is delivered to valve 99 and by it directed to line 109 through check valve 112, which permits flow in one direction only, to line 105 and passageway 104 into chamber 103. Fluid from chamber 102, no longer under pressure, is exhausted by way of passage 101 and line 100 to four-way valve 99 for return by way of line 110 to reservoir 111. It is seen there is no restriction to the flow when hydraulic fluid is exhausted from chamber 102, consequently the speed of carriage on a return stroke is always at the maximum operating speed.

Concurrently with delivery of fluid to reciprocate work carriage 62 for a cutting stroke, hydraulic fluid from the other of the pumps indicated at 96 is delivered through pressure line 113 to pilot-operated four-way valve 114. Valve 114 directs it to line 115 and by way of hydraulic line 115, fluid is delivered simultaneously to branch lines 116 and 117. From the branch line 116, fluid is delivered to chamber 118 of movable hydraulic cylinder 79. Upon entry of pressurized fluid into chamber 118, slidable locking wedge 73 is caused to reciprocate as movable cylinder 79 is contained in the body of said locking wedge. Reciprocation of slidable locking wedge 73, of course, causes work supporting wedge 83 to be rotated upwardly for locking and places workpiece 92 in position for the cutting stroke. It is obvious that chamber 118 is chosen in order to reciprocate slidable locking wedge 73 in the same direction as that travelled by work carriage 62. At the same time, and on a cutting stroke, fluid from branch 117 is directed through control valve 119 and line 120 to chamber 40 of hydraulic cylinder 37 causing piston 38 to overcome retracting spring 41 and permit piston rod 39 to engage clamp arm 32, locking the cutting tool 58 in vertical adjustment. As fluid enters chamber 118, fluid in chamber 121 is exhausted by line 122 to valve 114 and directed to line 123 for return to reservoir 111. For a return reciprocation, fluid under pressure is directed by four-way valve 114 into line 122 to chamber 121 causing cylinder 79 and hence slidable locking wedge 73 to be retracted. Fluid in chamber 118, no longer pressurized, returns through line 116, meeting that in line 117 exhausted from chamber 40 as spring 41 returns piston 38. From line 115, valve 114 directs it to line 123 and reservoir 111. Thus, it is seen that on the retraction of carriage 62 and slidable locking wedge 73, cutting tool 58 is not locked and may be given further vertical adjustment.

Valve 119 may be adjusted manually by shifting lever 124 to an alternate position, preventing fluid under pressure from entering chamber 40. In this event, the fluid is directed through valve 119 directly to line 125 and to the reservoir 111, in which case, the cutting tool 58 is not locked in vertical adjustment on the cutting stroke. Valve 119 may be operated in this manner on finishing strokes when it is often desirable to have the cutting tool 58 always unlocked.

Automatic operation is provided by pilot valve means 126, having levers 127, 128 so disposed as to be alternately shifted upon engagement by dogs 129, 130 of work carriage 62 as it reciprocates. Pilot valve 126 is employed to govern the direction of flow of pressurized hydraulic fluid simultaneously through four-way valves 99 and 114. The alternate shifting of levers 127, 128 upon engagement by dogs 129, 130 directs pressurized hydraulic fluid through valve 126 to valves 99 and 114 for shifting the piston (not shown) in each to alternately direct fluid through said valves 99, 114 in such manner as to reciprocate cylinders 66 and 79 in timed relationship in one direction for a cutting stroke and then to cause their return in an opposite direction with consequent locking and unlocking of cutting tool 58.

A further control means, valve 131 with manually operated lever 132, is provided to stop the operation at any stage of the cycle, should it be found desirable, and particularly as a precautionary means for preventing injury to any part in emergency. Start button 133 and stop button 134 are used to control the starting and stopping of electric motor 95.

Formal changes may be made in the specific embodiment of the invention described without departing from the spirit and substance of the invention, the scope of which is commensurate with the appended claims.

What is claimed is:

1. In a planing machine, a base, the combination of a rotatably movable work supporting wedge and slidable locking means mounted on a reciprocable work carriage on said base, said slidable locking means having a V-shaped aperture along a side adjacent the work supporting wedge, automatic hydraulic means for reciprocating said work carriage, automatic hydraulic means for effecting independent reciprocation of the slidable locking means in the direction of the work supporting wedge in such manner as to cause said V-aperture to lockingly engage the work supporting wedge as the work carriage is reciprocated for a cutting stroke and to unlock the work supporting wedge on a return stroke.

2. In a planing machine having a base, a reciprocable work carriage mounted thereon, a work support and workpiece holder mounted on a rotatably movable work supporting wedge secured to said work carriage for reciprocation therewith, automatic hydraulic means for causing reciprocation of said work carriage, a slidable locking means mounted upon said work carriage, said slidable locking means having a V-shaped aperture along a side adjacent the work supporting wedge, said V-aperture having one surface sufficiently long to engage the work supporting wedge when that member is in unlocked, lowered position, said surface acting as a guide to direct the work supporting wedge into the V-aperture to insure positive locking of said work supporting wedge as the work carriage is reciprocated for a cutting stroke, and automatic hydraulic means for independently reciprocating the slidable locking means into locking engagement with the work supporting wedge.

JAMES MARTIN.

REFERENCES CITED

The following references are of record in the file of this patent:

UNITED STATES PATENTS

| Number | Name | Date |
|---|---|---|
| 974,187 | Riddell | Nov. 1, 1910 |
| 1,087,363 | Gardiner | Feb. 17, 1914 |
| 1,295,157 | Hanson | Feb. 25, 1919 |
| 1,875,910 | Zimmermann | Sept. 6, 1932 |
| 1,891,356 | Parsons | Dec. 20, 1932 |
| 1,913,975 | Coe | June 13, 1933 |
| 1,956,023 | Gron | Apr. 24, 1934 |
| 2,103,147 | Cole | Dec. 21, 1937 |
| 2,405,434 | Krainer | Aug. 6, 1946 |